Feb. 23, 1932.    N. HARRISON    1,846,329
STORAGE BATTERY
Filed June 7, 1926
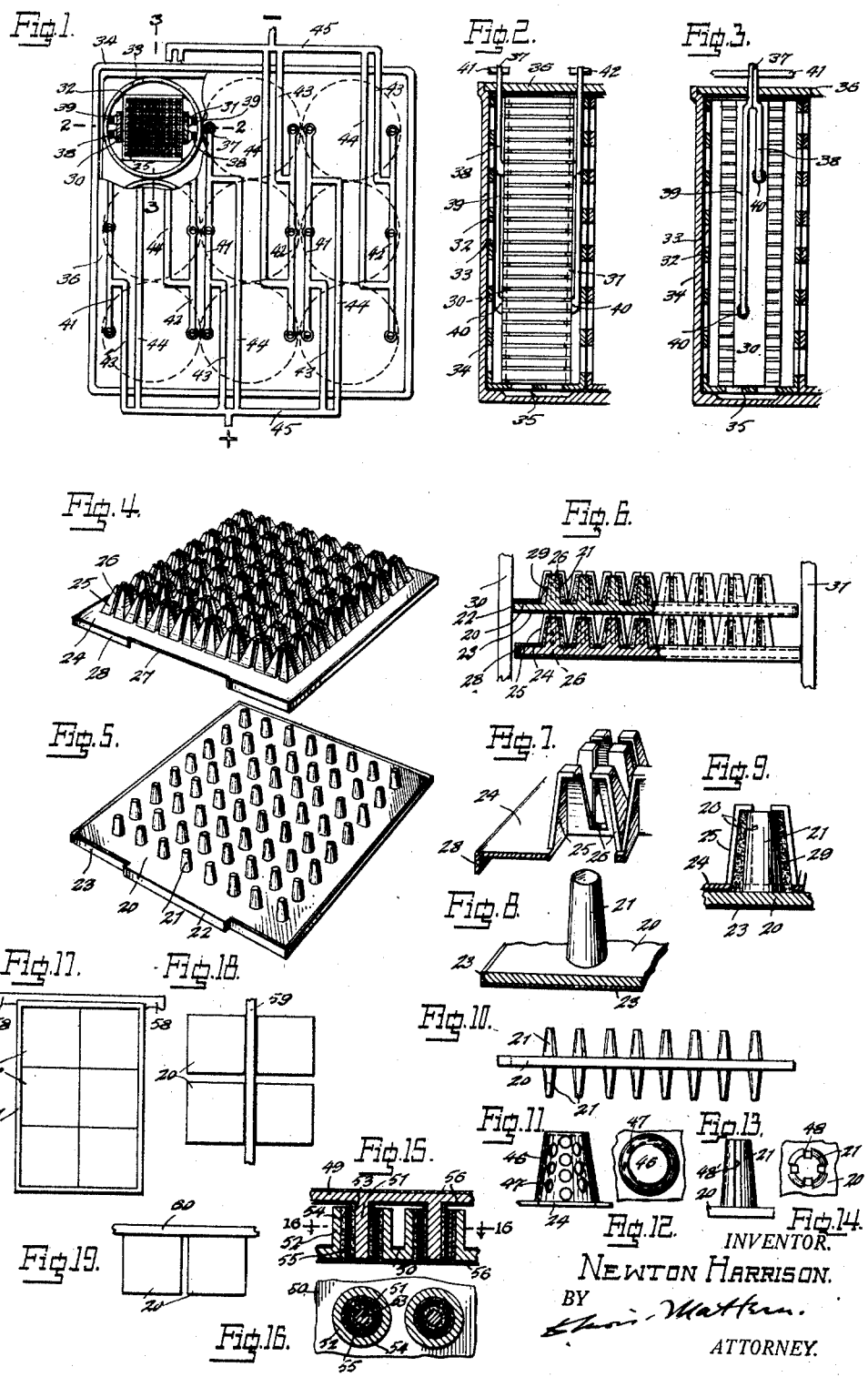
INVENTOR.
NEWTON HARRISON.
BY
ATTORNEY.

Patented Feb. 23, 1932

1,846,329

UNITED STATES PATENT OFFICE

NEWTON HARRISON, OF MILFORD, CONNECTICUT

STORAGE BATTERY

Application filed June 7, 1926. Serial No. 114,135.

The present invention relates to secondary or storage batteries and cells, and has for an object to provide a battery or cell of this type which may be charged in a minimum of time or discharged under maximum load without injury, and in which the active material is provided in relation to a plurality of individual electrodes, structurally related for strength, support, and conduction, and supported or retained thereon in a manner to expose the greatest possible surface to the electrolyte, without proportionate increase in the weight or size of the cell.

Another object is to provide a battery cell which will have a much greater capacity for a given weight than can be secured with the batteries now generally employed, or to secure a battery of the same capacity as those now generally used but which will be much lighter in weight. To this end, the invention contemplates a novel principle of sub-division, which, carried to its logical theoretical limits, would permit of an infinitely large ampere hour charge at a normal ampere rate, in an infinitely short period of time, and without material increase in the weight of the supporting structure or space occupied; and which, in practice, will enable the time for a given ampere hour charge to be reduced proportionately to the extent of sub-division, that is, proportionately to the decrease or increase in the number of individual active-material-containing electrodes provided for a given weight and occupied space.

A further object is to provide a structure in which the usual separators may be disposed of, and whereby a more compact, economical, and efficient structure is obtained.

Another object is to provide a storage cell of greatly reduced internal resistance.

A further object of the invention is to provide a novel supporting structure for the active material which will sustain the same in such manner that it will not only be exposed to the electrolyte to the maximum extent, but also so that it will not easily become loosened from the supports and thus be useless in operation, and therefore the capacity of the battery will not be reduced, or the active material wasted.

To this end, I propose, in the present embodiment of the invention, to provide a storage cell having a very large number of independent relatively small electrodes, preferably arranged in structurally related groups, that is a structural unit, according to the exemplary embodiment disclosed herein, which will consist of a metallic or other conductive base having a plurality of electrode posts supported or formed thereon and which contain active material in the form of relatively thin layers or films, so that each unit presents within a relatively small confine, a very large exposed surface of active material. As the plates may be made very small—say 1 inch square—and very thin—say $\frac{1}{32}$ of an inch thickness—and within practical limits may be provided upon one or both sides with a great number of separated electrode posts $\frac{1}{8}$ of an inch high, each containing a surface coating or film of active material, a very large number of units may be employed in a relatively small dimensioned cell, and the active material subdivided to the greatest practical degree so as to expose the greatest possible surface of a given weight of active material to the electrolyte. This will give a greater power of rapid charging and discharging than has ever been possible heretofore. I further propose to provide each structural electrode unit, or group, with a retaining shield adapted to hold the active material in place and permit circulation and access to the electrolyte.

The units are adapted to be supported in superimposed or adjacent relation, positive and negative units alternating in arrangement, and the structure is such that a very rigid support of the electrodes is provided, and any possibility of distortion, strain, or buckling, due to heavy currents or from mechanical causes is eliminated. Each plate unit is actually composed of a connected group of individual electrodes, each electrode serving its purpose without strains or stresses as an individual though diminutive plate carrying its quota of active material and immersed in its quota of electrolyte. Whatever strain ensues through charge or discharge is not general with respect to the plate as a whole, but only affects the particular electrode or post carrying that particular portion of the whole charging or discharging current. By removing the strain incident to the discharge of plates, particularly from the structure of the plate as a whole, and centering it around the individual positive and negative electrodes or posts, the base of the plate remains unaffected in all cases, the electro-chemical action being confined wholly to the minute electrodes and active material carried thereby. By this system of direct sub-division of the cell as a whole into thousands of individual electrodes or plates, the strain of heavy charge or discharge is equally sub-divided, irrespective of the current, into as many thousands of parts as there are electrodes.

Theoretically, the best results will be secured by using a layer of active material as nearly of infinitesimal thickness as possible, and passing through this a normal current per unit of area, in which event we would get a maximum charge in a minimum of time, and a maximum discharge in a minimum of time, without any abnormal conditions obtaining, because all of the active material would be exposed to the electrolyte. In fact if the active material presented a thin film to the electrolyte, theoretically, a current of hundreds or thousands of amperes applied for a few minutes, or less, would reduce it to a fit condition for service without any abnormal current flow per unit of area. Also, on the other hand, the same enormous surface of this thin layer of active material would supply an enormous current on discharge without an abnormal flow per unit of area. My invention is therefore directed to getting as nearly as possible to this theoretical condition in a practical construction. It has been found in practice that in a plate 1 inch square, the sub-division of the plate into a base $\frac{1}{32}$ of an inch thick, with 64 electrode posts or rods (8 rows of 8 each) $\frac{1}{8}$ of an inch high, an approximately superficial area of 4 square inches, or $\frac{1}{2}$ square inch per row, was obtained, with the active material forming a truncated pyramid on each electrode rod or post. For plates divided into 12 x 12, or 144 electrodes, each holding active material in the form of a truncated pyramid, the average superficial area exposed to the electrolyte remained constant, or approximately $\frac{1}{2}$ square inch per row, or six square inches per plate. A plate of 20 x 20, or 400 electrodes, would have an approximately superficial area of 10 square inches. Consequently, the exposed surface of the plate to the electrolyte is increased proportionately by the number of rows, if the surface of each row is constant for a 1 inch plate. The physical limitations of area of this system of sub-division of the plate into electrodes is reached by the closeness of approach of the walls of the truncated pyramids representing the separation, the increase of area of the plate surface being limited by the fact that electrolyte must be adequately provided for each electrode, and the passages or furrows between the pyramids must allow of this to a degree called for by electro-chemical data.

By reducing the cell into thousands of minute cells in which the active material is in form of a thin layer or film, a more efficient use is made of the weight of metal and oxide per unit of power when charging or discharging. The only limitations to the extent of the charge is the degree of normal absorption and transformation of the current into active oxides on the positive and negative electrodes. If the charge and discharge ratings of these minute electrodes is within the rules of experience, there will be no abnormal flow of current per unit of surface in either case. This rating is governed by the hours of charge, whether 10, 8, 5, 4, etc., according to the requirements, and the consequent current density per square inch results therefrom. At a .04 ampere rate per square inch, it would take 25 square inches to call for a one ampere charging current. With 250 square inches of positive plate or electrodes, a 10 ampere current would take 10 hours to supply a 100 ampere hour cell with its charge. If that cell had 1000 square inches of positive surface adequately provided, it would take only one-quarter of the time to completely charge it. The charge is dependent upon the rate of proper absorption of the current, both as regards area of surface to be charged, and the extent of active material to be transformed. Inadequate superficial area and structural insufficiency have heretofore retarded the use of large currents for charge and discharge, without inefficiency and mechanical risk, and the present invention has therefore been conceived to provide a structure having a very large area within a small space to enable transformation of a greater quantity of active material in less time, and designed to avoid strain and buckling under the effects of heavy currents, as well as derangement or fracture from vibration, shock, and other mechanical causes, and further to provide such a structure in which an increase in the charging rate and capacity may be obtained without proportionate increase in weight.

The penetration of the current in charging and discharging is limited to a fraction of an inch below the surface of the active material, so that the disposition of the active material in such manner that its depth is in the nature of a film, or very thin layer, on the metal electrode, will facilitate the absorption of current more readily per unit of weight of the oxide on charge, and its corresponding exit on discharge, and will lead to a higher efficiency in the more complete use of the active material on charge and discharge.

My system of sub-division of the active material will allow an increase of the charging and discharging rates without increasing the current density per unit of surface of active material, and with the same density of current per unit of surface of active material I may charge and discharge the battery in a much shorter time without injury, as for a given weight of active material I obtain a maximum surface exposed to the electrolyte with a minimum of thickness, therefore practically using the entire amount of active material without waste. This has not been possible with the modern storage battery structure heretofore in use, and in such cells the process of boosting, or heavy abnormal discharge, increases the current density per unit of area of the surface of active material exposed to the electrolyte above the current density this material can handle with safety, with the result that the plates are exposed to stresses and strains, and consequent loosening and dislodgement of the active material, due to the excessive expansion and contraction caused by such boosting and abnormal discharge. This is not true of the cell according to my invention, as a heavy charge or discharge current may be used without increasing the current density per unit of surface area of the active material above the normal rate; and to further obviate this difficulty, I propose to provide a novel shielding means for the active material which will dispense with the use of separators and permit the plates to be arranged either horizontally, vertically, or at an inclination.

I further propose to provide a cell in which there will be a free escape of gas bubbles to prevent polarization; but with my construction of battery cell, the current density per unit of surface of active material exposed to the electrolyte is never abnormal, there is never abnormal polarization, and with normal charging and discharging current, polarization is decreased, because with these rates of charge and discharge, the current density per unit of active material is so small that it will not produce polarization.

Another advantage I secure by my multiple unit cell, is reduced resistance in the cell as the exposed surface of active material is increased. Thus there will be no increase of current density per unit of cross sectional area of electrolyte with the increased charging and discharging amperage employed, and so there will be no heating with these increased amperages above that of ordinary practice in the cells now in use. On the other hand, the exposed surface of active material is very great in this sub-divided cell, and therefore the ordinary discharge of the present commercial cell, if used in my cell, would mean a much less density of current per unit area. As a result, the current density per unit of cross sectional area of the electrolyte is very small, so consequently there is less resistance, less heating, less heat losses, and a greater efficiency than in ordinary cells.

Another important result secured with my sub-divided type of cell is that the units are much stronger in proportion to the area exposed than the large plates now generally employed, these large plates, although made as thin as practicable, being necessarily of considerable thickness in order to support their weight and the weight of the active material, and it will therefore be apparent that these large plates occupy a great deal of space within the battery cell which is useless for current generating and absorbing purposes. This is because the depth for a short time to which the electrolyte reacts with the active material is superficial and governed by the time, very seldom more than $\frac{1}{32}$ of an inch, and usually, if not always, much less than that, depending upon the time.

By my system of sub-division, providing a very large number of individual electrodes, the active material may be made of a thickness calculated as the theoretical maximum to which the electrolyte reacts, and thus there will be no waste of active material and a very little space which is useless for generating and absorbing purposes.

The aim of my invention, generally, is to add to the surface, to remove the effects of strains, to keep the current per unit of area normal while permitting a high absorption and discharge, to use active material without considerable depth, and to effect a maximum sub-division of the current.

With the above and other objects in view, embodiments of my invention are shown in the accompanying drawings, and these embodiments will be hereinafter more fully described with reference thereto, and then the invention will be finally pointed out in claims.

In the drawings:

Fig. 1 is a top plan view of a battery according to one embodiment of my invention, one of the units of the cell being shown in section;

Fig. 2 is a vertical section along the line 2—2 of Fig. 1;

Fig. 3 is a vertical section along line 3—3 of Fig. 1;

Figs. 4 and 5 are superimposed perspective views of the shield and multiple electrode plate elements employed.

Fig. 6 is a view partially in section and partially in elevation, showing two of the assembled units;

Figs. 7 and 8 are enlarged superimposed perspective views, partly in section, of individual electrode and shield elements;

Fig. 9 is an enlarged sectional view thereof assembled with the active material;

Fig. 10 is an edge elevation of a modified form of plate;

Figs. 11 and 12 are side and top views of the modified form of shield element;

Figs. 13 and 14 are side and top views of modified form of electrode post element;

Fig. 15 is a vertical sectional view of a further modified form of multiple electrode plate;

Fig. 16 is a horizontal sectional view thereof along the line 16—16 of Fig. 15; and Figs. 17 and 18 and 19 are diagrammatic elevations showing three exemplary ways of supporting the plate units in vertical relation.

Similar reference characters indicate corresponding parts throughout the several figures of the drawings.

Referring to the drawings, and more particularly Figs. 1 to 9 thereof, the embodiment of the invention shown therein comprises a plurality of positive and negative plate units for electrode groups arranged within a cell, hereinafter more fully referred to, and each comprising a thin flat plate 20 (Figs. 5 and 8) of lead, lead alloy, or other suitable material, substantially rectangular in form, and having a plurality of spaced upright electrodes or posts 21 of truncated cone form, as shown, preferably arranged in rows of a number corresponding to the number of posts in a row. The posts 21 are shown as integrally formed with the plate 20, but obviously they may be otherwise suitably formed or supported in relation thereto. A tongue 22 is provided at one edge of the plates to facilitate their connection to conductor posts, hereinafter more fully referred to, and at the under surface, and along its edges, the plate is coated with a layer of protective insulation 23, as asphaltum, enamel, celluloid composition, or the like, the tongue 22, however, being free from this insulating coating.

A shield (Figs. 4 and 7) of hard rubber or the like is adapted to be placed over the plate 20 and its electrodes 21, and comprises a base 24 having a plurality of truncated pyramids or shells 25 formed thereon and provided in the same arrangement as the posts 21 of the plate 20, the edges of these truncated pyramids substantially meeting at the base 24 and their diverging sides providing connecting passages or furrows between them for free circulation of the electrolyte, as will hereinafter more fully appear. Each of the shells 25 is slotted cross-wise as at 26 to provide slotted openings extending centrally along each of the side walls from the slotted truncated top to the base 24, and adapted, as will presently appear, to expose active material to the electrolyte. At one edge the base is provided with a recess 27 adapted to register with the tongue 22 of the plate 20, and is further provided with a marginal flange 28 adapted to engage over the edge of the plate 20.

The active material 29 is placed within the truncated pyramid shells 25 in surrounding relation to the supporting electrode posts 21, the plate and shield assembly being such that the posts 21 are disposed centrally within the shells 25 in spaced relation to the walls of the shell, and with the upper ends of the posts engaging the under surface of the tops of the shells to support the latter against collapse in the superimposed stacked relation of the several units.

Each cell unit comprises a plurality of superimposed positive and negative plates alternating in arrangement and connected by vertical conductor posts 30 and 31 engaged with the tongue 22 and secured by burning the plates to the posts, the other ends of the respective positive and negative plates being separated from the posts of the plates of opposite polarity, as clearly indicated in Fig. 6. The cell unit, thus formed of a plurality of superimposed interleaved positive and negative plates, is immersed in the electrolyte, and each unit is enclosed in a tubular casing or jar 32 of insulating material provided in its side walls and base with a plurality of perforations 33 to facilitate free circulation of the electrolyte. The plates are engaged at their corners against the inner walls of the tubes 32 and are thus positively mounted and supported, and each unit may be assembled outside the cell and then slipped into the tubes. The several tubes are placed in a container 34 in contact with each other so that they are rigidly supported against movement. The bottom of the container is cut away, as at 35, to facilitate circulation of the electrolyte.

The conductor posts 30 and 31 may be extended upwardly through openings in the top 36 to provide binding posts for the connection of the bus bars. I preferably provide an improved connection, as disclosed in my application Serial Number 618,904, filed February 14, 1923, (now Patent No. 1,587,951, granted June 8, 1926) which will distribute the current substantially uniformly to the various plates, and also decrease the size of the conductors required. For this purpose, I have shown extending from each binding post 37 two leads or conductors 38 and 39, the short lead 38 being connected to the conductor post at a point 40 located a distance from the upper end thereof substantially equal to one-quarter the length of the post from the top thereof, the long lead being similarly connected with relation to the bottom. Thus, it will be seen that the short lead will supply the plates at the upper half of the unit, while the longer lead will supply the plates at the lower half, and the posts need not be greater in cross section than is required to carry current to one-quarter of the plates connected to this post. In other words, the conductors need only be one-fourth the cross sectional area of a conductor to which all the current is applied at one end. I have shown two leads only, but this is merely illustrative, and obviously more may be used if found expedient, or where an unusually high unit using a large number of plates is employed. As shown in Fig. 1 I have also extended this system of connections to the leads leading to the bus bars so as to get a more uniform distribution of current to the units, as well as to the individual plates, and also to reduce the size of the bus bars. The positive posts of one row of units are connected to a single bus bar 41, and the negative posts of the same row are connected to a bus bar 42, and to each of the bus bars there are connected two leads 43 and 44 leading from a common connection 45, the short lead 43 and the long lead 44 being respectively connected intermediate the points of connection of the bus bars to the cell units.

The tubular casings 32 may be of any desired cross sectional shape—square, rectangular, or polygonal—but I prefer the cylindrical form as it gives better space for electrolyte at the edges of the plates and between the casings, so that there will be more equal distribution and better circulation of the electrolyte, and it will have free access to the active material at all times.

It will be apparent from the foregoing description that the active material is carried upon a very large number of independent relatively small electrodes arranged in structurally related groups, each group occupying a relatively small superficial area, but adapted to provide a very large exposed surface of active material per unit of weight to the electrolyte, which has free circulation and access to each sub-division of the active material. Also, that by further sub-division of each structurally related group the exposed surface of active material may be increased without proportionate increase in weight or occupied space, and consequently my system permits of very rapid charging and discharging without increasing the current density per unit of surface of active material. The structural form of the electrodes is such that in the superimposed relation of the plates a very rigid and strong assembly is provided, and any tendency of the plates or electrodes to buckle or distort under stresses or strains, due either to heavy charging or discharging current, or mechanical causes, is eliminated. The weight of the structure is supported on the superimposed truncated cone-shaped electrodes, and the plates, therefore, which act only as supports and conductors for the electrodes may be very thin.

It will further be apparent that the electrode groups, either positive or negative, each comprising a plate 20, its shield 24, and active material about the electrode posts, may be kept in stock and merely assembled in one or more cells to give the size and capacity of battery desired. As there is no possibility of loosening the active material, there is no necessity of providing a large mud chamber beneath the plates, as is now generally done.

In Fig. 10 I have illustrated a modified form of the invention in which the base plate 20 is provided at each side with electrode projections 21, the unit thus exposing twice the area of active material surface to the electrolyte.

Figs. 11 and 12 illustrate a modified form of shield in which the portions 46 are of truncated cone shape and provided with a plurality of perforations 47 in the side walls.

Figs. 13 and 14 illustrate a modified form of electrode posts having longitudinal slots or recesses 48 therein, the active material adapted to be retained against displacement through interlocking engagement in such recesses.

In Figs. 15 and 16, I have illustrated a modified form of construction in which the multiple electrode unit comprises a pair of assembled plate elements 49 and 50, the plate 49 having a plurality of electrode posts 51 adapted to engage in annular spaced relation within cylindrical electrode cup portions or annuli 52 provided on the plate 50, the posts 51 having active material 53 on their cylindrical portions, while the portions 52 have active material 54 on their inner cylindrical surfaces, separated from the active material 53 by a corrugated porous separator 55. Both plates 49 and 50 are coated at their upper and lower surface with an insulating layer 56.

In Figs. 17 and 18 and 19 I have illustrated several exemplary ways in which the multiple electrode units formed according to my invention may be assembled or supported in vertical arrangement, Fig. 17 showing the same arranged in a rectangular frame 57 having hangers 58 at the upper corners, Fig. 18 showing them secured and supported upon a vertical conductor rod or post 59, and Fig. 19 showing them supported in hanging relation upon a horizontal conductor rod or post 60.

I have illustrated and described preferred and satisfactory embodiments of the invention, but it will be obvious that changes may be made therein within the spirit and scope thereof, as defined in the appended claims.

Having thus described my invention, what I claim and desire to secure by Letters Patent is:

1. In a storage battery cell, superimposed plates of positive and negative polarity disposed in a common electrolyte and each consisting of a common metallic conducting base insulated with respect to the electrolyte and a plurality of elongated metallic spaced electrode projections grouped thereon, perforated shields surrounding said electrodes in spaced relation, and active material respectively held on each of said electrodes by said shields, and independent of the active material of the other electrodes, said projections and shields adapted to form structural supports for a superimposed plate, conducting means connected to said plates of positive polarity and connecting them together in parallel, and other conducting means connected to said plates of negative polarity and connecting them together in parallel.

2. In a storage battery cell, superimposed plates of positive and negative polarity disposed in a common electrolyte and each consisting of a common conducting base and a plurality of elongated spaced electrode conducting projections grouped thereon, perforated shields surrounding said electrodes in spaced relation, and active material respectively held on each of said electrodes by said shields, and independent of the active material of the other electrodes, conducting means connected to said plates of positive polarity and connecting them together in parallel, and other conducting means connected to said plates of negative polarity and connecting them together in parallel.

3. A storage battery electrode comprising a conducting plate having a plurality of spaced electrode projections extending perpendicularly from the plane of the plate, non-conducting integral shield means having a plurality of perforated recessed portions spaced to correspond to the spacing of the electrode projections and adapted to receive said electrode projections in spaced relation, and active material supported between each of said electrode projections and the respective recessed portions independent of the active material of the other electrode projections, the whole adapted to be submerged in electrolyte.

4. A storage battery electrode comprising a conducting plate having a plurality of spaced electrode projections extending perpendicularly from the plane of the plate on each side thereof, non-conducting integral shield means on each side respectively, said shield means having a plurality of perforated recessed portions spaced to correspond to the spacing of the electrode projections and adapted to receive said electrode projections in spaced relation, and active material supported between said electrode projections and recessed portions on each side of the plate, the whole adapted to be submerged in electrolyte.

Signed at Bridgeport, in the county of Fairfield, and State of Connecticut, this 4th day of June, 1926.

NEWTON HARRISON.